United States Patent [19]
Coendoz

[11] Patent Number: 5,881,761
[45] Date of Patent: Mar. 16, 1999

[54] HYDRAULIC VALVE AND LIQUID-DISPENSING INSTALLATION EQUIPPED WITH SUCH VALVES

[75] Inventor: Jean-Pierre Coendoz, Savoie, France

[73] Assignee: Cellier Groupe S.A., France

[21] Appl. No.: 974,847

[22] Filed: Nov. 20, 1997

[30] Foreign Application Priority Data

Dec. 10, 1996 [FR] France .................................. 96 15396

[51] Int. Cl.[6] ..................................................... B08B 9/04
[52] U.S. Cl. ...................... 137/268; 251/326; 15/104.062
[58] Field of Search ............................ 137/268; 251/326, 251/318, 319, 329, 244; 15/104.062, 104.05, 3.5

[56] References Cited

U.S. PATENT DOCUMENTS

| 2,820,479 | 1/1958 | Jenkins, Jr. ........................... 251/326 R |
| 3,146,477 | 9/1964 | Bergman et al. ........................ 137/268 |
| 5,193,572 | 3/1993 | Le Devehat ............................ 137/244 |

Primary Examiner—Kevin Lee
Attorney, Agent, or Firm—Wall Marjama Bilinski & Burr

[57] ABSTRACT

Valve (1) for establishing communication between two pipes, these being an upper pipe (8) and a lower pipe (7), and in which each pipe, (7, 8) can accommodate at least one scraper (32), the valve (1) comprising a stationary body (2) with passages (3, 4; 5, 6) for connecting to the pipes, a moving shut-off member (20) inside the body (2), and an operator (30) for operating said shut-off member (20), wherein:

the axes of said pipes are offset;

and the moving shut-off member (20) is pierced across its section with a through-orifice (23) that corresponds to the diameter of the upper pipe (8), and on its face that faces the lower pipe (7) has a protruding portion (25) that can be housed in an opening (15) in the communication region (9) while the through-orifice (23) is coinciding with the connection passages (5, 6) of the upper pipe (8), wherein the edges of the portion form a stop for one of the scrapers (32) of the upper pipe (8) when the valve is open.

9 Claims, 4 Drawing Sheets

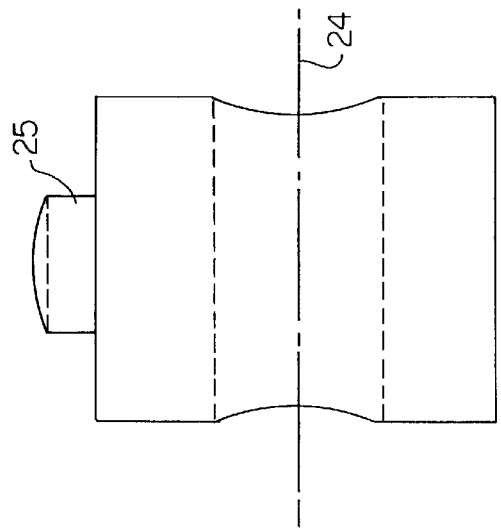
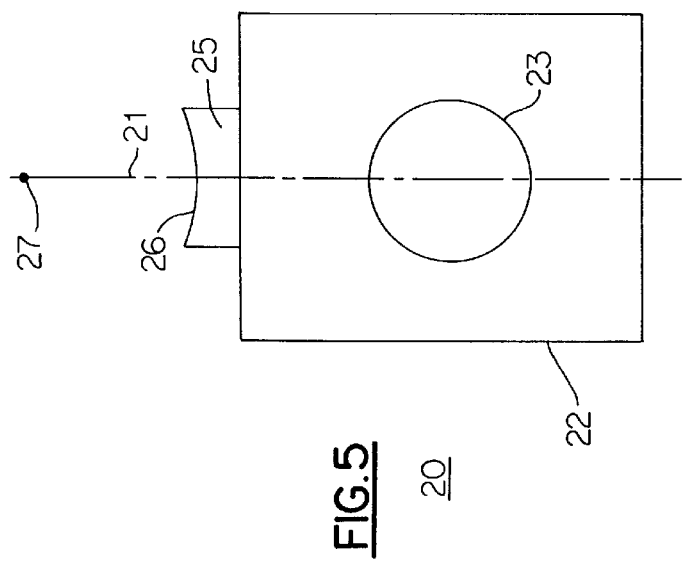
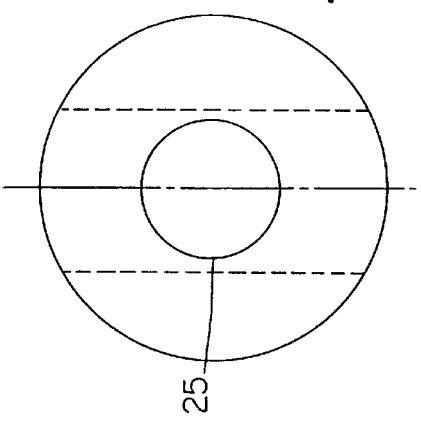

HYDRAULIC VALVE AND LIQUID-DISPENSING INSTALLATION EQUIPPED WITH SUCH VALVES

TECHNICAL FIELD

The invention relates to the field of hydraulic hardware, and it is targeted more specifically at a multiway valve of a novel type. The invention also relates to a liquid-dispensing installation equipped with such valves. Such installations may prove advantageous in the papermaking industry, the lubricant industry, or other spheres.

PRIOR ART

In many industries it is necessary to prepare solutions by mixing various basic liquids. Thus, in the papermaking industry for example, to produce a coating slip, ten or so products need to be mixed together. These products are conveyed from a set of reservoirs to an appropriate reactor. Now, it is known that for different qualities of paper, the ingredients vary. Thus, in existing installations, when the formulation changes, the configuration of the circuits for conveying from the reservoirs to the reactor or reactors is altered. This configuration is given by means of an array of flexible hoses, the ends of which are connected up in accordance with the type of distribution desired.

A solution of this kind has many drawbacks; it requires manual operations and cannot be automated. What is more, the use of hoses leads to the risk of the various solutions used being contaminated because it is difficult to use automatic scraping systems in such hoses.

SUMMARY OF THE INVENTION

A first problem that the invention therefore sets out to solve is that of the readily alterable configuration of a liquid-dispensing circuit.

A second problem is that of the possibility of cleaning such an installation automatically.

The invention alleviates the aforementioned drawbacks and solves the problems posed.

The invention therefore relates first of all to a valve for establishing communication between two pipes in which liquids flow, these being an upper pipe and a lower pipe, and in which each pipe can accommodate at least one scraper intended to sweep the internal wall of said pipes and push the liquid downstream, said valve comprising a stationary body with passages for connecting to the pipes, a moving shut-off member inside said body, and a means of operating said shut-off member.

This valve is one wherein:

the axes of said upper pipe and of said lower pipe are offset;

the body comprises two pairs of connection passages arranged in the directions of the pipes in question;

and the moving shut-off member is pierced across its section with a through-orifice that corresponds to the diameter of the upper pipe, and on its face that faces the lower pipe has a protruding portion, the overall contour of which corresponds to an opening made for this purpose in the communication region that opens into the lower pipe so as to be housed therein in order to coincide with the inside contour of the connection passages of the lower pipe while the through-orifice is coinciding with the connection passages of the upper pipe, while the edges of the protruding portion form a stop for one of the active scrapers of the upper pipe when the shut-off member is pulled back, that is to say when the valve is open.

In other words, the valve according to the invention allows two pipes arranged in two different planes and which are slightly offset one with respect to the other to be connected. Depending on its position, the shut-off member either isolates the two pipes, which are then not connected, or places them in communication with each other. In the closed position, that is to say when the two pipes are independent, the valve has geometry which is such that it allows a scraper to run down each of the passages, which makes it cleanable by automatic means.

In a preferred embodiment, the two pipes are orthogonal, but the invention also covers instances in which these pipes are at any angle, or are even parallel.

Advantageously in practice, the moving shut-off member is cylindrical and has an axis of symmetry perpendicular to the longitudinal axes of the pipes.

In a preferred embodiment, the protruding part of the moving shut-off member is also cylindrical and its axis of symmetry coincides with the axis of symmetry of the actual moving member.

The geometry of the valve according to the invention allows pipes whose inside diameters are different or identical to be placed in communication with each other.

In practice, the means of operating the shutoff member is mechanical, and for example consists of a handwheel operated by hand, and a worm, or, alternatively, is electromechanical or pneumatic.

The invention is also targeted at an installation equipped with a valve as described earlier. More specifically, it is targeted at an installation for dispensing a number of liquids from a first set of source reservoirs to a second set of target reservoirs by means of a first array and a second array of parallel pipes.

This installation is one wherein the arrays are arranged in two planes which are offset from one another, and comprises a valve as described earlier, arranged close to the regions where the pipes of the first and of the second array cross, so that said pipes are connected in a predetermined configuration.

Put another way, the valves described earlier, and assembled together, allow piping situated in parallel planes a few tens of centimeters apart to be placed in communication with each other. In the regions facing each other of the pipes of the two arrays, the valves in accordance with the invention installed on each connection open or keep closed the connection between the adjacent pipes.

BRIEF DESCRIPTION OF THE DRAWINGS

The way in which the invention can be achieved, and the advantages that stem therefrom will emerge clearly from the description of the embodiments which follow, supported by the appended figures in which:

FIG. 5 is a view of the moving shut-off member viewed in the direction of the axis of the upper pipe.

FIG. 6 is a view of the component of FIG. 5, shown in the direction of the axis of the lower pipe.

FIG. 7 is a view of the component of FIG. 5 shown in the direction of its axis of travel inside the body of the valve.

DESCRIPTION OF THE INVENTION

As already stated, the invention relates to a four-way valve intended to establish communication between two pipes which are offset one with respect to the other.

In general, in the figures, pipes that can be connected together are depicted as being perpendicular to each other, but the invention does, of course, cover instances in which these pipes are at varying angles, or are parallel.

Figure 1:
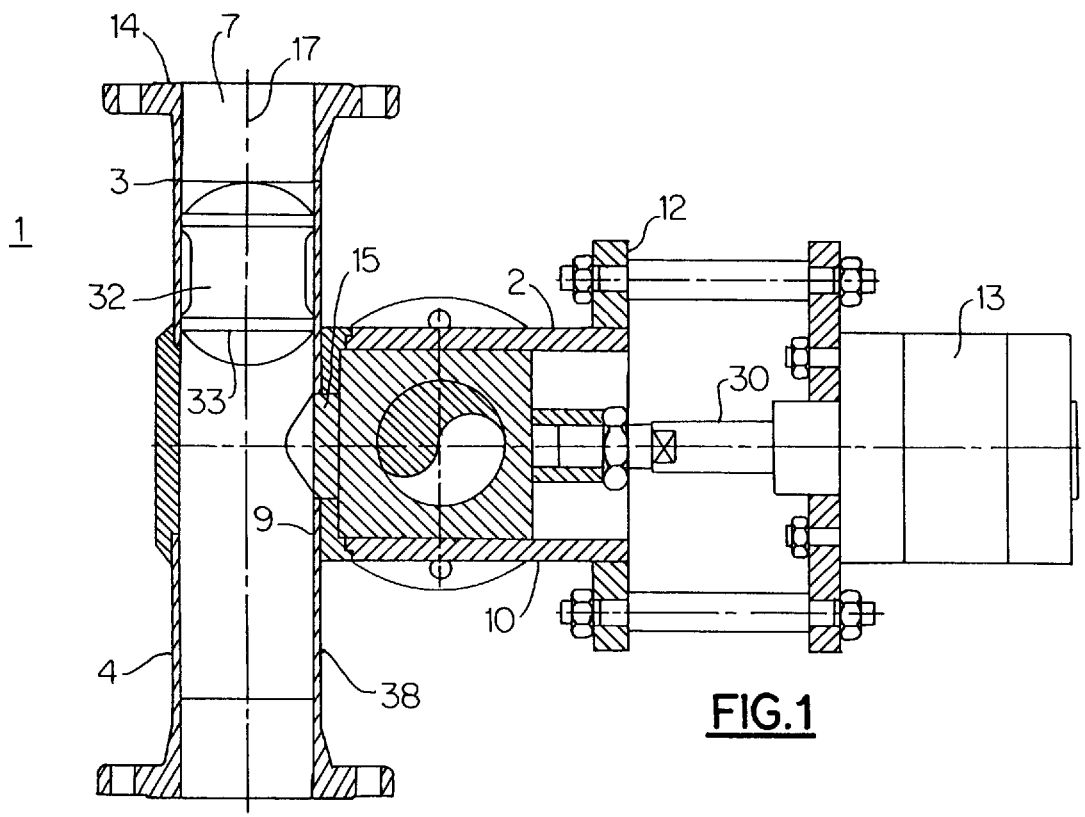
FIG. 1 is a view of a valve in accordance with the invention shown in section on a plane passing through the axis of the lower pipe and perpendicular to the axis of the upper pipe, shown in the "closed" condition.

As can be seen in FIG. 1, a valve of this kind is essentially composed of a body (2) associated with a pair of portions (3, 4; 5, 6) of pipework constituting the passages for connecting to the actual pipes (7, 8). The body (2) can be broken down on the one hand into a region (9) for communication between these two pipes (7, 8) and a portion (10) intended to accommodate and allow the sliding of a moving shut-off member (20). This portion (10) is extended by a mounting plate (12) that accommodates the operating member (13).

The valve (1) accommodates a moving shut-off member (20) illustrated separately in FIGS. 5 to 7.

As far as the valve body (2) is concerned, this may be made as a single piece, or not, depending on the chosen application and the mechanical quality required.

Figure 4:
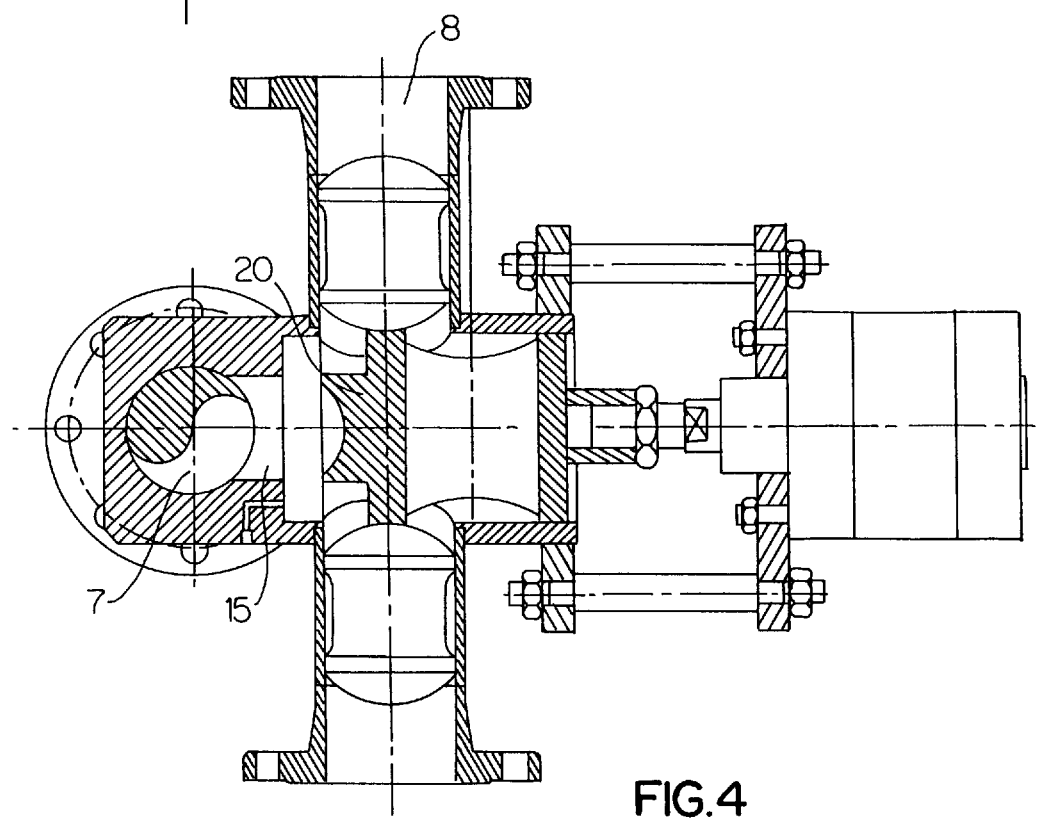
FIG. 4 is a section through FIG. 3, in which the valve is in the open position.

In the form depicted in FIGS. 1 and 4, these connection passages (3, 4; 5, 6) are mounted on a common base constituting the region (9) where the two pipes (7, 8) communicate with one another. Connecting disks (14) which are pierced right through are fitted to the passages (3, 4; 5, 6) to allow them to be secured to the adjacent pipes.

In the form illustrated in FIGS. 1 and 4, the lower pipe (7) and the upper pipe (8) have the same diameter, but the invention quite obviously covers alternative forms in which the diameters of these pipes are different.

The body (2) of the valve and more specifically the communication region (9) has a pierced part (15), which is advantageously circular but which may be of varying shape, establishing communication between the upper pipe (8) and the lower pipe (7).

According to an essential feature of the invention, the actual body (2) of the valve is designed to accommodate a moving shut-off member (20), the geometry of which is such that, depending on its position, it either allows the two pipes, the lower one (7) and the upper one (8), to communicate, or makes these independent of each other. This moving shut-off member (20) can travel inside the body (2) of the valve along an axis (21) perpendicular to the two axes (17, 18) of the pipes (7, 8).

In the form depicted, that portion (10) of the valve body (2) which is intended to allow the moving member to slide and the member (20) itself are of a cylindrical shape with a circular base. Quite obviously, the invention also covers alternative forms in which the shut-off member might have a cross section which is not circular but elliptical, square or rectangular, or more generally, polygonal.

This shut-off member (20) as depicted in FIGS. 5 and 7, has a cylindrical main portion (22), the generatrices of which are parallel to the axis (21) along which said member travels. This main portion (22) is pierced right through with a through-orifice (23), the diameter of which corresponds to the inside diameter of the upper pipe (8).

The through-orifice (23) is centered with respect to the main portion (22) of the moving member (20), and its axis of symmetry (24) is perpendicular to the axis of symmetry (21) of the moving member (20).

According to an important feature of the invention, the shut-off member (20) also comprises a protruding portion (25), the overall contour of which corresponds to that of the opening (15) formed for this purpose in the actual body (2) of the valve, and which serves as connection (9) between the lower pipe (7) and the upper pipe (8).

The end part (26) of this protruding region is shaped with a cylindrical profile, with curvature that equals that of the internal contour of the lower pipe (7). In this way, when this protruding portion (25) comes opposite the opening (15) of the valve body (2), the lower pipe (7) is perfectly cylindrical with constant cross section. The distance between the axis (24) of the through-orifice (23) and the center of curvature (27) of the end portion (26) of the protruding portion (25) is equal to the distance between the axes (17, 18) of the two pipes (7, 8).

The valve (1), and more specifically the body (2), is equipped with means for making said shut-off member move. In the form depicted, these means consist of electromagnetic or electropneumatic gear (30) known per se, and which need not be described in greater depth.

Figure 2:
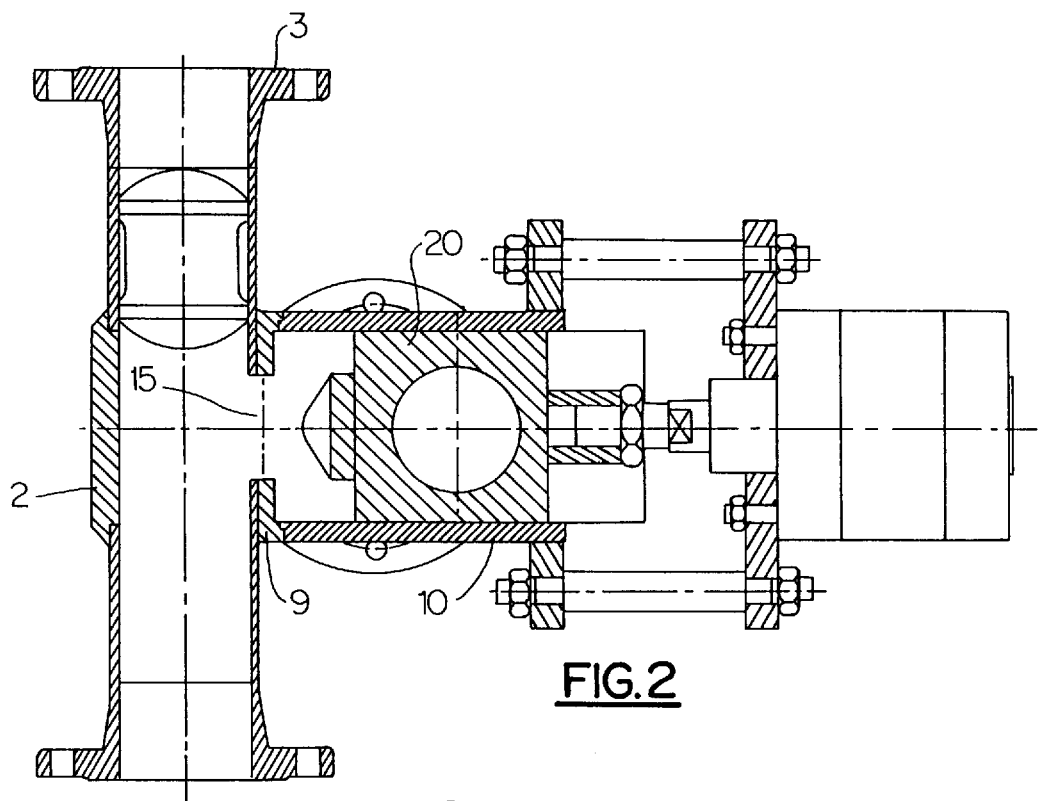
FIG. 2 is a section through FIG. 1 in which the valve is in the open position.

As already stated, one of the problems that the invention sets out to solve is of making it possible to scrape the various pipes (7, 8) that are connected by a valve in accordance with the invention. Thus, as can be seen in FIG. 1, the lower pipe (7) can accommodate a scraper element (32), known per se, for example one that has two elastomer lips (33) of a diameter that equals the inside diameter of the pipe (7). The configuration of the protruding region (25) of the shut-off member allows this scraper (32) to pass unencumbered along the inside of the pipe (7). In addition, as the diameter of the through-orifice (23) of the shut-off member (20) equals that of the upper pipe (8), scrapers (32) like those illustrated in FIG. 2 can travel along the inside of this upper pipe without encountering any obstacles when the axis (24) of this orifice (23) coincides with that (18) of the pipe (8). Thus, in the position illustrated in FIGS. 1 and 2, the two pipes (7, 8) are independent and can have different liquids running through them without the risk of mixing. The protruding region (25) of the shut-off member (20) closely follows the inside contour of the lower pipe (7), while the through-orifice (23) of the shut-off member lies within the upper pipe (8).

Conversely, when the shut-off member (20) is moved within the body (2) of the valve, the protruding portion (25) will uncover the opening (15) made in the body (2) and establishes communication between the upper pipe (8) and the lower pipe (7). In this way, the liquid can flow from the upper pipe (8) toward the lower pipe (7). This flow may be accompanied by the pushing of scrapers (32) as illustrated in FIG. 4. In this case, the shut-off member (20) forms a stop for the scrapers and halts their progress.

Figure 3:
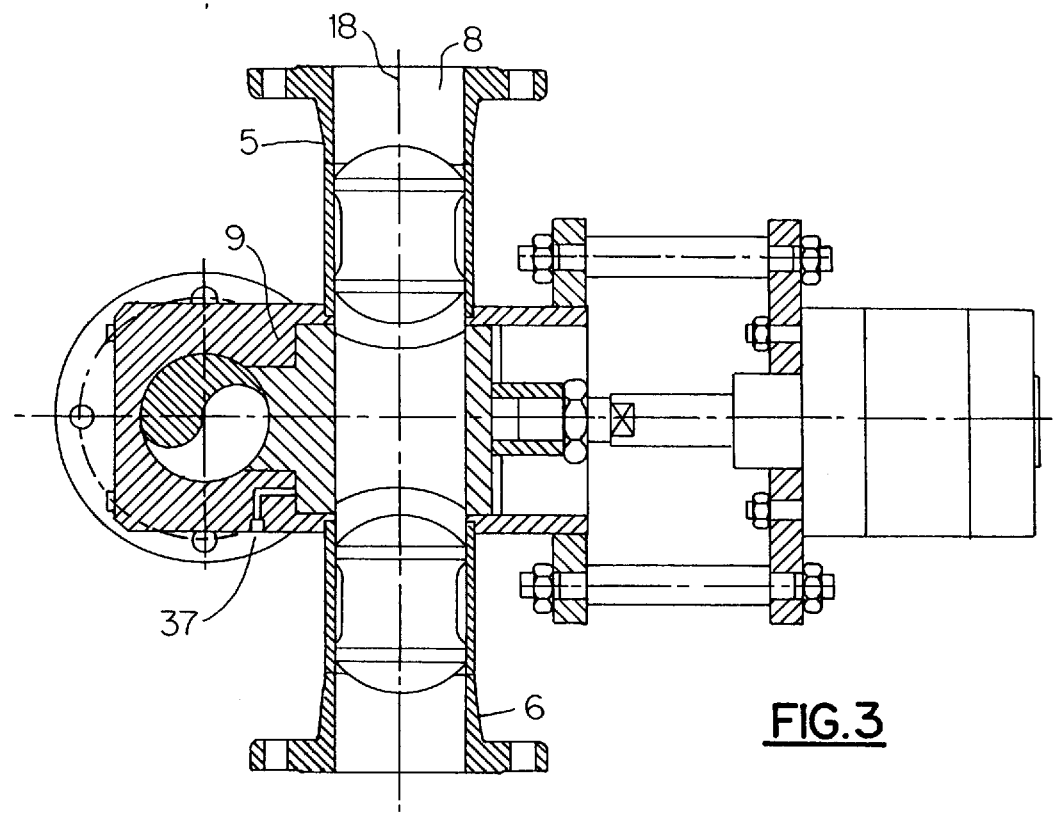
FIG. 3 is a sectional view of the same valve on a plane passing through the axis of the upper pipe and perpendicular to the axis of the lower pipe, shown in the "closed" condition.

As can be seen in FIGS. 3 and 4, leak-detection ducts (37) may be formed in the body (2) of the valve and especially in the region (9) for communication between the two pipes (7, 8) which delimits the opening (15), this being to allow the adequacy of the seal to be checked continuously. In addition, the shut-off member (20) has two concentric O-ring seals (not depicted) arranged on either side of the leak-detection duct (37) when the valve is in the closed position.

Furthermore, when scrapers (32) that have a magnetic element so that its location inside the pipes can be identified are being used, the connection passages (4) connected to the valve bodies have a region (38) which is made of a non-magnetic material. Thus, by installing appropriate detectors near these regions (38) it is possible to identify the presence of a scraper that corresponds to the end of a circulation phase, for example.

As already stated, the invention also relates to a liquid-dispensing installation equipped with valves in accordance with the invention.

Figure 8:
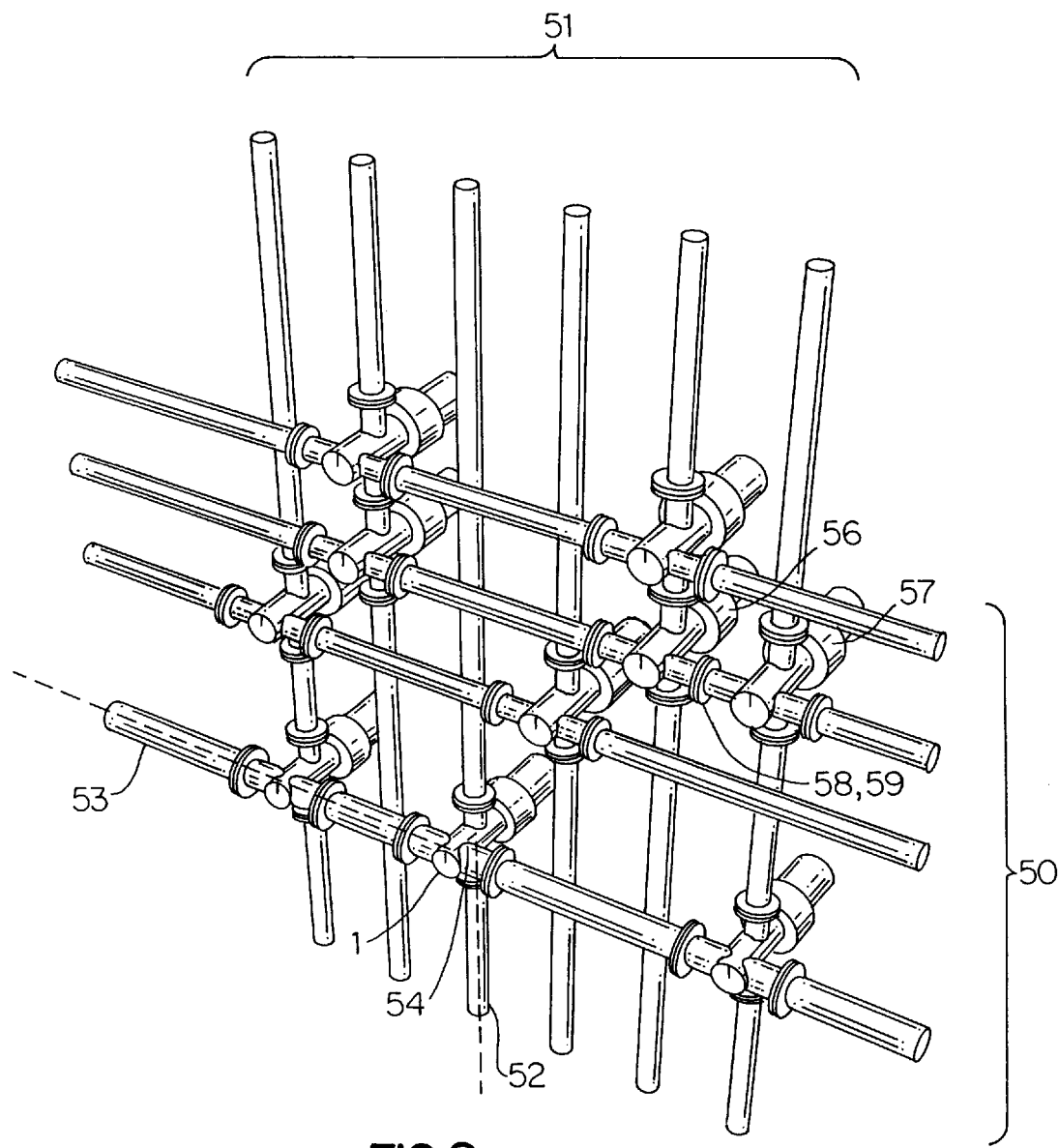
FIG. 8 is a sketchy perspective view of a detail of an installation in accordance with the invention.

Thus, as can be seen in FIG. 8, a dispensing installation has two arrays (50, 51) or rows of parallel pipes (52). These two arrays (50, 51) may or may not be perpendicular to one another, and lie in two parallel planes which are slightly offset, typically by a few tens of centimeters. A first array (50), for example the one illustrated as being horizontal, is connected to a set of source reservoirs, not depicted. The other array (51) is depicted vertically and is connected to a set of target reservoirs, or alternatively and more generally to various filling members, such as papermaking machines, refining units, lubricant units, for example, and more generally any installations for formulating and metering liquid products dispensed by pipework.

At the crossovers (54) between the horizontal and vertical pipes, a valve (1) in accordance with the invention is inserted and allows the corresponding pipes (52, 53) to be connected or otherwise. The multitude of valves (1) arranged at each of the crossovers between vertical and horizontal pipework allows multiple and reconfigurable connections in accordance with the desired routing of products from the source reservoirs to the target reservoirs.

Advantageously, when there is a desire to insert two valves (56, 57) in accordance with the invention at two adjacent pipework crossovers, the valves, or more specifically their passages (58, 59) that face each other are connected directly.

It is clear from the foregoing that the valves in accordance with the invention have a number of advantages, and in particular:

- great mechanical simplicity, because just one component moves inside the valve;
- sealing is ensured by the moving bearing surface;
- the pipework can be scraped out when the valve is in the closed position, because the cylindrical shape of the tubes is restored;
- the moving shut-off member acts as a stop for the scraper.

Furthermore, the installation in accordance with the invention, that is to say one equipped with characteristic valves, has the essential advantage of allowing connection between any pipework of the first and of the second array, this connection being alterable as desired to obtain a predetermined dispensing configuration.

I claim:

1. A valve for establishing communication between two pipes that includes:
    a first pipe section and a second pipe section, each having an interior passage that passes therethrough, said pipe sections being angularly offset and lying in separate planes so that one pipe section crosses the other within a crossover region;
    a body element for connecting the two pipe sections within the crossover region, said body element having an interior opening that opens into each pipe section,
    a shut off member slidably mounted within the opening of said body element that is movable between a closed position to an open position,
    said shut off member containing a through hole that corresponds to the interior passage in said second pipe section and is in axial alignment with the interior passage in the second pipe section when the shut off member is in the closed position,
    said shut off member further including a protruding member having a contour that complements the interior passage of said first pipe section, said protruding member being arranged to close the opening in said first pipe section when the shutoff member is in the closed position and,
    drive means for moving the shut off member from an open position wherein said first and second pipe sections are in communication and a closed position wherein the two pipe sections are isolated one from the other whereby fluid can flow unimpeded through the two pipe sections.

2. The valve of claim 1 having coupling means for connecting the pipe sections to pipelines for conducting fluids between a source reservoir and a target reservoir.

3. The valve of claim 2 wherein the first and second pipe sections are perpendicularly aligned.

4. The valve of claim 1 wherein the interior passages of said pipe sections are cylindrical and correspond to the openings in said pipelines.

5. The valve of claim 1 wherein the interior passage of the first section has a diameter that is different from that of the second pipe section.

6. The valve of claim 5 that further includes scraper means that are movably mounted within the pipe sections.

7. The valve of claim 6 wherein said shutoff member acts as a stop for the scraper means mounted in said second pipe section when the shutoff member is in the open position.

8. An installation for dispensing a number of liquids from a first set of source reservoirs to a second set of target reservoirs through a pipeline network, said installation including:
    a first set of parallel pipelines and a second set of parallel pipelines that are arranged in separate adjacent planes wherein the pipes in one set of lines cross over the pipes in the other set of lines;
    valve means mounted in some of the crossover regions for placing the pipes in one set of lines in fluid flow communication with pipes in the other set of lines,
    each valve means further including:
    a first pipe section that is connected into a first pipeline in said first set of lines and a second pipe section that is connected into a second pipeline in said second set of lines, each pipe section having an interior passage that passes therethrough;
    a body element for connecting the first and second pipe sections, said body element having an interior opening that opens into each of the pipe sections;
    a shutoff member slidably mounted within the opening of said body element that is movable between a closed position and an open position;
    said shutoff member containing a through hole that corresponds to the interior passage in the second pipe section and is in axial alignment with the interior passage in said second pipe section when the shutoff member is in the closed position;
    said shutoff valve further including a protruding member having a contour that complements the interior passage of said first pipe section, said protruding member being arranged to close the opening in said first pipe section when the shutoff member is in the closed position; and
    drive means for moving the shut off member between an open position wherein said first and second lines are in fluid flow communication and a closed position wherein said first and second lines are isolated one from the other.

9. The installation of claim 8 wherein the pipes in the first set of lines are perpendicularly aligned with the pipes in the second set of lines.

* * * * *